US012769183B2

(12) United States Patent
Ushio

(10) Patent No.: US 12,769,183 B2
(45) Date of Patent: Oct. 20, 2026

(54) BLADE OPEN-CLOSE DEVICE

(71) Applicant: NIDEC PRECISION CORPORATION, Tokyo (JP)

(72) Inventor: Ryosuke Ushio, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 154 days.

(21) Appl. No.: 18/761,312

(22) Filed: Jul. 2, 2024

(65) Prior Publication Data

US 2025/0013123 A1 Jan. 9, 2025

(30) Foreign Application Priority Data

Jul. 4, 2023 (JP) ................................ 2023-110135

(51) Int. Cl.
*G03B 9/26* (2021.01)

(52) U.S. Cl.
CPC .................................... *G03B 9/26* (2013.01)

(58) Field of Classification Search
CPC ........ H04N 23/50; H04N 23/51; G03B 11/04; G03B 11/043; G03B 11/00; G03B 9/26; G03B 9/08; G03B 9/10; G03B 17/00; G03B 17/02
See application file for complete search history.

(56) References Cited

U.S. PATENT DOCUMENTS

| | | | | |
|---|---|---|---|---|
| 8,368,989 B2 | 2/2013 | Numnual et al. | | |
| 11,611,687 B2 * | 3/2023 | Ushio | H04N 23/51 | |
| 11,758,254 B2 * | 9/2023 | Ushio | H04N 23/55 348/374 | |
| 11,921,403 B2 * | 3/2024 | Ushio | G06F 1/1684 | |
| 12,517,416 B2 * | 1/2026 | Sawanobori | G03B 11/043 | |
| 2020/0196142 A1 * | 6/2020 | Yang | H04W 12/02 | |
| 2020/0374432 A1 * | 11/2020 | Cho | G06F 21/86 | |
| 2021/0033948 A1 * | 2/2021 | Ushio | G03B 11/043 | |
| 2021/0349374 A1 * | 11/2021 | Hung | G06F 1/1686 | |
| 2022/0021791 A1 * | 1/2022 | Imai | H04N 23/55 | |
| 2022/0091478 A1 * | 3/2022 | Sawanobori | G03B 11/043 | |
| 2022/0091479 A1 * | 3/2022 | Sawanobori | G03B 11/043 | |

* cited by examiner

*Primary Examiner* — Kelly L Jerabek
(74) *Attorney, Agent, or Firm* — HAUPTMAN HAM, LLP

(57) ABSTRACT

A blade open-close device includes an aperture blade having an opening on an optical axis of a lens and extending in an intersecting direction intersecting with an optical axis direction of the optical axis of the lens, a blade movable in the intersecting direction, a drive moving the blade to a closing position to cover the opening or an opening position to uncover the opening, a transmission member transmitting a driving force of the drive to the blade, a body to which the aperture blade, the blade, the drive, and the transmission member are attached, and a restrictor restricting movement of the blade in the intersecting direction. The aperture blade and the transmission member are located between the body and the blade in the optical axis direction. The body has an upper surface facing the aperture blade and the transmission member. The restrictor is located on the upper surface.

20 Claims, 7 Drawing Sheets

BLADE OPEN-CLOSE DEVICE

RELATED APPLICATIONS

The present application claims priority to Japanese Application Number 2023-110135, filed Jul. 4, 2023, the disclosure of which is hereby incorporated by reference herein in its entirety.

BACKGROUND

Technical Field

The present invention relates to a blade open-close device.

Description of the Background

A known light amount adjustment device for a camera includes multiple blades to reduce the aperture size by covering the opening in the substrate of the camera. Patent Literature 1 describes a light amount adjustment device including multiple blades movably supported on a substrate. In the device in Patent Literature 1, sliding plates to prevent malfunction of the blades are each located between blades.

CITATION LIST

Patent Literature

Patent Literature 1: Japanese Unexamined Patent Application Publication No. 2010-8894

BRIEF SUMMARY

When any of the sliding plates is not attached in the device in Patent Literature 1 during manufacture, the blades interfere with one another and malfunction while moving. Thus, such a device that malfunctions in a performance test is determined to be a defective product to which any of the sliding plates is unattached.

The accuracy of detecting a failure to attach a sliding plate is to be improved.

A blade open-close device according to an embodiment includes an elongated member having an opening on an optical axis of an optical unit and extending in an intersecting direction intersecting with an optical axis direction in which the optical axis of the optical unit extends, a blade movable in the intersecting direction to cover or uncover the opening, a drive that moves the blade to one of a closing position to cover the opening or an opening position to uncover the opening, a transmission member that transmits a driving force generated by the drive to the blade, a body in which the elongated member, the blade, the drive, and the transmission member are located, and a restrictor that restricts movement of the blade in the intersecting direction. The elongated member and the transmission member are located between the body and the blade in the optical axis direction. The body has a facing surface facing the elongated member and the transmission member. The restrictor is located on the facing surface.

The blade open-close device according to the above embodiment of the present invention can restrict the movement of the blade when the elongated member or the transmission member is unattached.

DETAILED DESCRIPTION

A blade open-close device according to one or more embodiments of the present invention and an electronic device including the blade open-close device will now be described in detail with reference to the drawings.

Electronic Device

Figure 1:
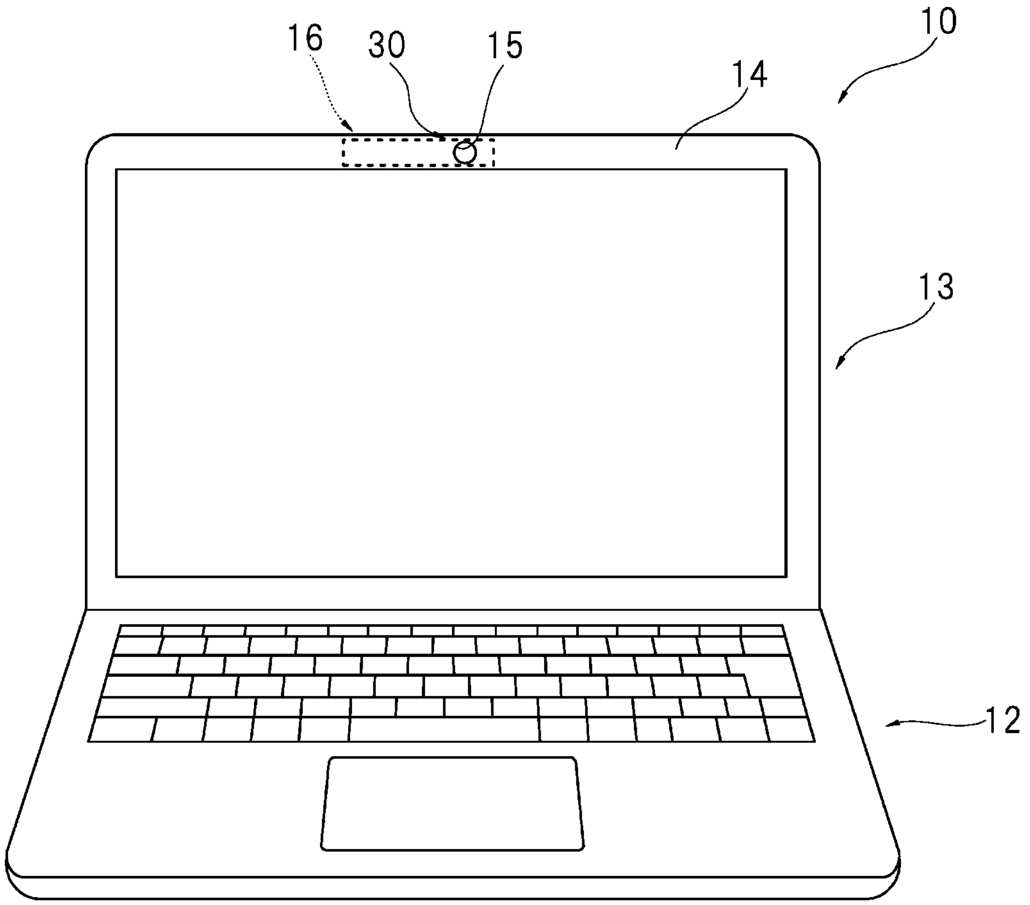
FIG. 1 is a diagram of a laptop personal computer incorporating a blade open-close device according to an embodiment, showing its overall structure.

FIG. 1 is an external view of a laptop personal computer (PC) 10 as an example of an electronic device. The laptop PC 10 includes an input unit 12 for input operations, such as a keyboard, and a display 13 for displaying information. The display 13 includes a frame 14. The frame 14 has a hole 15. The frame 14 incorporates a camera unit 16 and a blade open-close device 30 (described in detail later). In other words, the laptop PC 10 includes the blade open-close device 30. The blade open-close device 30 is attached to the camera unit 16 and incorporated in the laptop PC 10. The laptop PC 10 thus has the camera function.

An electronic device including the blade open-close device 30 is not limited to the laptop PC 10, and may be another electronic device having the camera function, such as a smart speaker or a home security camera.

Camera Unit

Figure 2:
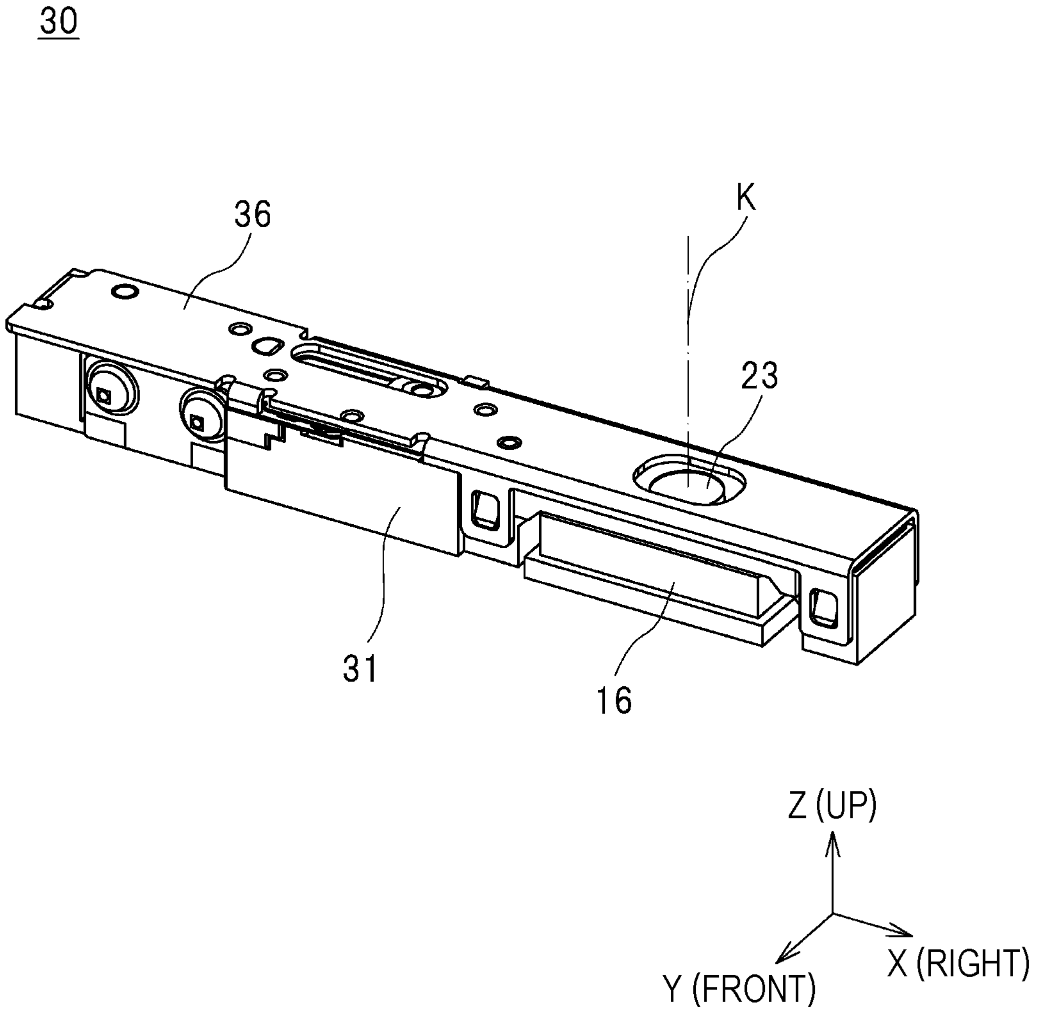
FIG. 2 is an external perspective view of the blade open-close device.

FIG. 2 is an external perspective view of the blade open-close device 30 in the laptop PC 10. The camera unit 16 in the laptop PC 10 is accommodated in the blade open-close device 30. The camera unit 16 includes a lens 23. The lens 23 is attached to the frame 14 to align with the hole 15 shown in FIG. 1. The lens 23 has an optical axis K. The optical axis K extends in an optical axis direction indicated by arrow Z. External light enters the lens 23 in the direction from the arrowhead to the base of arrow Z.

Blade Open-Close Device 30

Figure 3:
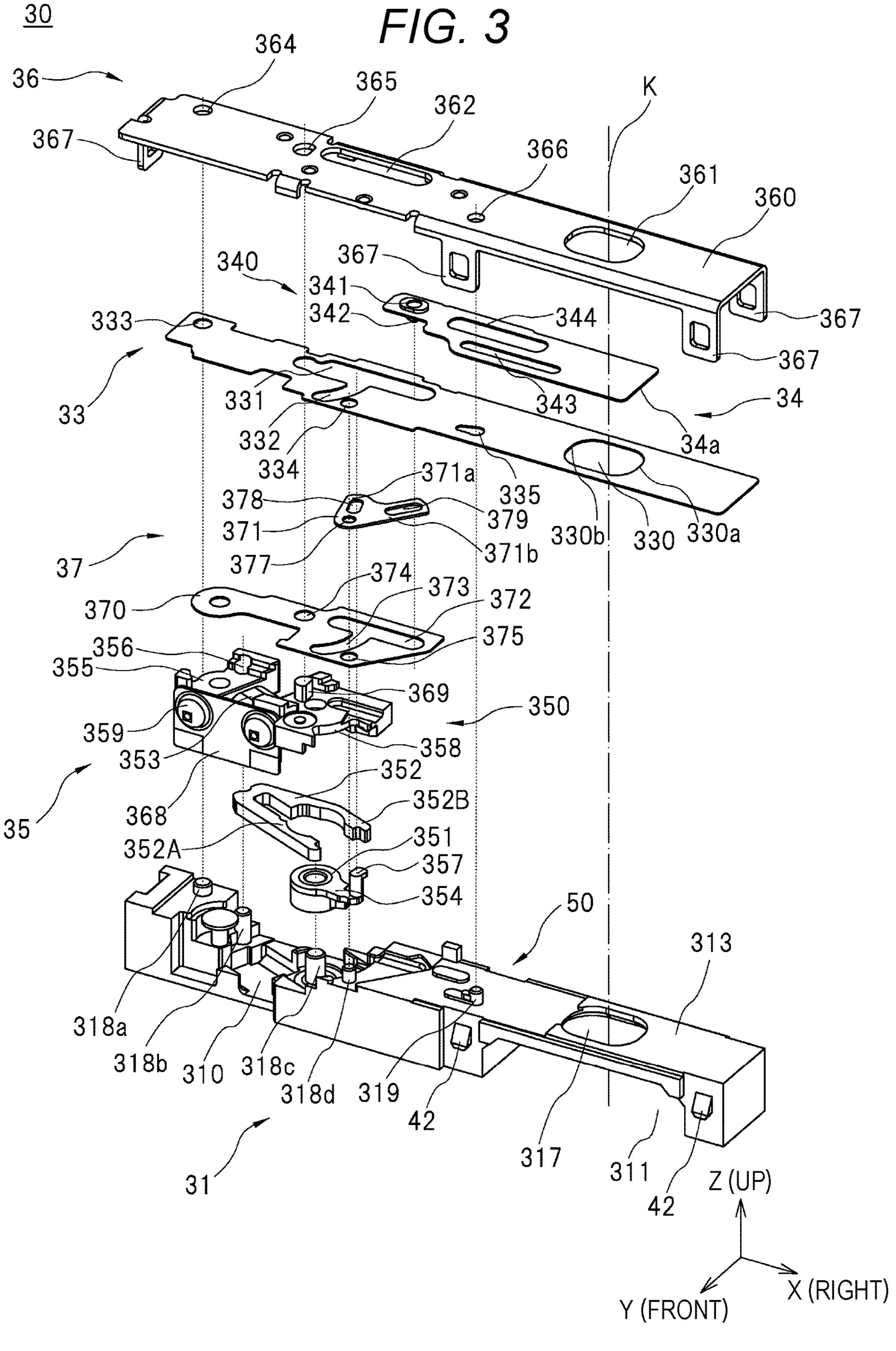
FIG. 3 is an exploded perspective view of the blade open-close device.

FIG. 3 is an exploded perspective view of the blade open-close device 30. The blade open-close device 30 extends in the direction indicated by arrow X. The direction indicated by arrow X is perpendicular to the optical axis direction indicated by arrow Z. The direction indicated by arrow X is an example of an intersecting direction intersecting with the optical axis direction. The intersecting direction corresponds to the longitudinal direction of the blade open-close device 30 as viewed in the optical axis direction. The intersecting direction is parallel to a direction in which a blade 34 (described in detail later) moves. A direction perpendicular to the direction indicated by arrow X (intersecting direction) and to the direction indicated by arrow Z (optical axis direction) is indicated by arrow Y. The direction indicated by arrow Y corresponds to the lateral direction of the blade open-close device 30 as viewed in the optical axis direction.

The positive Z-direction may be hereafter referred to as being upward, and the negative Z-direction as being downward. The positive X-direction may be hereafter referred to as being rightward, and the negative X-direction as being leftward. The positive Y-direction may be hereafter referred to as being frontward, and the negative Y-direction as being rearward.

The blade open-close device 30 includes a body 31, an aperture blade 33, the blade 34, a drive 35, a cover 36, a transmission member 37, and a restrictor 50.

Body 31

The aperture blade 33, the blade 34, the drive 35, the cover 36, and the transmission member 37 (all described in detail later) are located in the body 31. The body 31 has a lower surface fixed inside the laptop PC 10, which is an electronic device, by, for example, bonding. The body 31 may be removably attached to the laptop PC 10.

The body 31 has a rectangular shape longer in the intersecting direction than in the front-rear direction, which intersects with the optical axis direction and the intersecting direction, as viewed in the optical axis direction. The body 31 includes a first compartment 310 and a second compartment 311. The first compartment 310 is a recess on a left portion of an upper surface 313 of the body 31. The first compartment 310 accommodates the drive 35 (described later). The second compartment 311 is a recess on a right portion of the lower surface of the body 31. The second compartment 311 accommodates the camera unit 16. The second compartment 311 has an upper surface with a body opening 317. The body opening 317 extends through the upper surface 313 above the second compartment 311 in the optical axis direction. The body opening 317 has its center on the optical axis K of the lens 23.

The body 31 has the upper surface 313 that is a facing surface facing the aperture blade 33 and the transmission member 37 (both described later) in the optical axis direction. The restrictor 50 (described later), bosses 318*a*, 318*b*, 318*c*, and 318*d*, and a guide pin 319 are located on the upper surface 313 of the body 31. More specifically, the boss 318*a* is located on the left of the first compartment 310 on the upper surface 313. The bosses 318*b*, 318*c*, and 318*d* are located in the first compartment 310. The boss 318*d* is located on one second restriction flat surface 524 (refer to FIG. 4) of the restrictor 50 (described later) located on the upper surface 313. The guide pin 319 is located on a first restriction flat surface 510 (refer to FIG. 4) of the restrictor 50 located on the right of the first compartment 310. The bosses 318*a*, 318*b*, 318*c*, and 318*d* and the guide pin 319 are protrusions that protrude upward.

Projections 42 are located on the left and the right of the second compartment 311 on the front side surface of the body 31. The projections 42 protrude frontward. More specifically, the projections 42 each have a slope with its lower end protruding more frontward than its upper end. Although not shown in the figures, projections that are the same as the projections 42 are also located on the rear side surface and the left side surface of the body 31. The projection on the left side surface of the body 31 protrudes leftward.

Aperture Blade 33

The aperture blade 33 is located on the body 31. In other words, the upper surface 313 of the body 31 described above faces the aperture blade 33. The aperture blade 33 is a plate-like elongated member having a predetermined thickness in the direction along the optical axis K and extending in the left-right direction (specifically, the intersecting direction). The aperture blade 33 has a length in the intersecting direction equal to or substantially equal to the length of the body 31 in the intersecting direction.

The aperture blade 33 has an opening 330, a first guide hole 331, a second guide hole 332, and attachment holes 333, 334, and 335. The attachment hole 333 receives the boss 318*a*. The attachment hole 334 receives the boss 318*d*. The attachment hole 335 receives the guide pin 319.

The opening 330 extends through the aperture blade 33 in the optical axis direction. The opening 330 is located above the lens 23 in the camera unit 16. More specifically, the opening 330 has its center located on the optical axis K of the lens 23 and aligned with the center of the body opening 317 in the second compartment 311. The opening 330 thus overlaps the body opening 317 in the body 31 in the optical axis direction. The opening 330 functions as a diaphragm (aperture) that determines the amount of light entering the lens 23.

The first guide hole 331 is elongated linearly in the intersecting direction as viewed in the optical axis direction. The first guide hole 331 receives an insertion portion 342 included in the blade 34 (described later). The first guide hole 331 guides the movement of the insertion portion 342 in the intersecting direction. The first guide hole 331 receives a boss 369 (described later) near its left end.

The second guide hole 332 is arc-shaped as viewed in the optical axis direction. The second guide hole 332 has one (rear) end continuous with the front side surface of the first guide hole 331. The second guide hole 332 receives a connector 357 included in the drive 35 (described later). The second guide hole 332 guides the movement of the connector 357.

Blade 34

The blade 34 is a plate having a predetermined thickness in the optical axis direction. The blade 34 is a rectangle longer in the intersecting direction than in the front-rear direction as viewed in the optical axis direction. The blade 34 is located on the aperture blade 33 and movable by the drive 35 (described later) in the intersecting direction. In other words, the aperture blade 33 is located between the body 31 and the blade 34 in the optical axis direction.

The blade 34 is shorter than the aperture blade 33 in the intersecting direction. Thus, the blade 34 moves to switch the opening 330 in the aperture blade 33 between being uncovered and being covered (shielded). More specifically, the blade 34 is located on the aperture blade 33, which is an elongated member, in a manner movable in the intersecting direction, and covers and uncovers the opening 330.

The blade 34 has a through-hole (not shown) in a portion near its left end. The through-hole receives an engagement member 340. The engagement member 340 includes a head 341 and the insertion portion 342. The head 341 is located above the blade 34. The insertion portion 342 extends downward from the head 341 through the through-hole and can be received in a second insertion hole 379 in a lever blade 371 (described later).

A guide hole 343 is located rightward and frontward from the engagement member 340. The guide hole 343 is an elongated hole extending through the blade 34 in the optical axis direction and having long sides extending in the intersecting direction. The guide hole 343 receives the guide pin 319. An elongated hole 344 is located rearward from the guide hole 343. The elongated hole 344 extends through the blade 34 in the optical axis direction and has long sides extending in the intersecting direction.

The blade 34 with the above structure is moved by the drive 35 (described later) in the intersecting direction. More specifically, when the blade 34 moves rightward and has its right end 34*a* at a position rightward from a right end 330*a* of the opening 330, the blade 34 covers the opening 330. The position of the blade 34 in this state may be referred to as a closing position. The blade 34 at the closing position blocks light traveling through the opening 330 and the body opening 317 toward the lens 23. This prevents light from entering the lens 23.

When the blade 34 moves leftward and has the right end 34*a* at a position leftward from a left end 330*b* of the opening 330, the blade 34 uncovers the opening 330. The position of the blade 34 in this state may be referred to as an opening position. When the blade 34 is at the opening position, external light travels through an opening 361 in the cover 36 (described later), the opening 330 in the aperture blade 33, and the body opening 317 in the body 31 and enters the lens 23. FIG. 2 shows the blade open-close device 30 with the blade 34 at the opening position. FIG. 3 shows the blade open-close device 30 with the blade 34 at the closing position.

Cover 36

The cover 36 is located above the blade 34. More specifically, the cover 36 covers the camera unit 16 as well as the body 31, the aperture blade 33, the blade 34, and the drive 35 (described in detail later) included in the blade open-close device 30 from above. The cover 36 includes an upper plate 360 defining an upper end portion of the blade open-close device 30. The upper plate 360 has a predetermined thickness in the optical axis direction and extends in the intersecting direction. The upper plate 360 has a rectangular outer shape longer in the intersecting direction than in the front-rear direction as viewed in the optical axis direction. In other words, the cover 36 is a cover member extending in the intersecting direction to cover the blade 34. As described above, the blade 34 is located on the aperture blade 33. The blade 34 thus moves in the intersecting direction in a space defined by the cover 36 as a cover member and the aperture blade 33 as an elongated member. The upper plate 360 has a length in the intersecting direction longer than the length of the aperture blade 33 in the left-right direction.

The upper plate 360 has the opening 361, a guide hole 362, and attachment holes 364, 365, and 366. The opening 361 extends through the upper plate 360 in the optical axis direction. The opening 361 has its center on the optical axis K of the lens 23. More specifically, the opening 361 is located above the opening 330 in the aperture blade 33 and the body opening 317 in the second compartment 311. The attachment hole 364 receives the boss 318*a*. The attachment hole 365 receives the boss 369 (described later). The attachment hole 366 receives the guide pin 319.

The guide hole 362 is elongated linearly in the intersecting direction as viewed in the optical axis direction. The guide hole 362 is located above the first guide hole 331 in the aperture blade 33 described above. The guide hole 362 guides the head 341 in the blade 34 described above in the intersecting direction.

The upper plate 360 includes multiple mounts 367 extending downward from its front end, rear end, and left end. Each mount 367 is a rectangular frame as viewed in the front-rear direction or in the left-right direction. The cover 36 is attached to the body 31 from above with the multiple mounts 367 engaged with the respective projections 42 on the body 31.

Drive 35

The drive 35 moves the blade 34 to either the closing position to cover the opening 330 or the opening position to uncover the opening 330. The drive 35 includes a rotor magnet 351, a yoke 352, a coil 353, and a terminal plate 368 that are attached to an attachment member 350. The attachment member 350 to which the rotor magnet 351, the yoke 352, the coil 353, and the terminal plate 368 are attached is accommodated in the first compartment 310 to attach the drive 35 to the body 31. The attachment member 350 accommodated in the first compartment 310 has its outer shape defining a part of the outer shape of the body 31.

The attachment member 350 has an upper surface 355 with an attachment hole 356 and the boss 369. The upper surface 355 includes a part of the restrictor 50 (described later). As described above, the attachment member 350 has the outer shape defining a part of the outer shape of the body 31. Thus, a part of the restrictor 50 included in the attachment member 350 is included in the body 31.

The attachment hole 356 is a through-hole extending through the upper surface 355 in the vertical direction. The attachment hole 356 receives the boss 318*b* located in the first compartment 310. The boss 369 is a protrusion that protrudes upward from the upper surface 355. The upper surface 355 has a right end 358 cut into an arc. The end 358 aligns with the side wall surface of the arc-shaped second guide hole 332 in the aperture blade 33 described above in the vertical direction.

The coil 353 is a winding that is wound around a winding mount in the attachment member 350 for attachment. The coil 353 is electrically connected to the terminal plate 368. The terminal plate 368 is flat and attached to the front side surface of the attachment member 350 with fixtures 359. The terminal plate 368 is electrically connected to a power supply (not shown).

The yoke 352 is formed from a magnetic material and includes an arm 352A and an arm 352B. The arms 352A and 352B in the yoke 352 are accommodated in the attachment member 350 described above. The arms 352A and 352B are magnetized to have polarities different from each other when the coil 353 is energized.

The rotor magnet 351 is accommodated in the attachment member 350. The rotor magnet 351 accommodated in the attachment member 350 is located between the arm 352A and the arm 352B in the yoke 352. The rotor magnet 351 includes magnets with different magnetic poles in the circumferential direction. When the arm 352A and the arm 352B are magnetized to have polarities different from each other in response to the coil 353 being energized, a repulsive force or an attractive force acts on each magnet in the rotor magnet 351. The rotor magnet 351 thus rotates when the coil 353 is energized. The rotor magnet 351 rotates in a different direction when a current supplied to the coil 353 flows in a different direction.

A lever 354 is attached to the upper end of the rotor magnet 351. The lever 354 extends radially outward from the rotor magnet 351. The lever 354 includes the connector 357 being a hook. The connector 357 moves along the arc-shaped end 358 of the upper surface 355 as the rotor magnet 351 rotates as described above.

Transmission Member 37

The transmission member 37 transmits, to the blade 34, a rotational driving force that is generated as the rotor magnet 351 in the drive 35 rotates and allows the blade 34 to move in the intersecting direction. The transmission member 37 includes a partition 370 and a lever blade 371. The transmission member 37 is located between the body 31 and the aperture blade 33 in the optical axis direction. In other words, the transmission member 37 is located between the body 31 and the blade 34 in the optical axis direction.

Partition 370

The partition 370 is located above the rotor magnet 351, or specifically, at the upper end of the drive 35 and on the upper surface 313 of the body 31. More specifically, the partition 370 is located on placement surfaces 523 (refer to FIG. 4) described later. The partition 370 partitions the internal space of the first compartment 310 in the body 31 and a space in which the lever blade 371 is located. In other words, the partition 370 is located between the lever blade 371 and the body 31 in the optical axis direction. The partition 370 has a third guide hole 372, a fourth guide hole 373, and through-holes 374 and 375. The through-holes 374 and 375 extend through the partition 370 in the vertical direction. The through-hole 374 receives the boss 369. The through-hole 375 receives the boss 318*d*.

The third guide hole 372 is elongated linearly in the intersecting direction as viewed in the optical axis direction. The third guide hole 372 is located below the first guide hole 331 in the aperture blade 33. The third guide hole 372 receives the insertion portion 342 included in the blade 34. The third guide hole 372 guides the movement of the insertion portion 342 in the intersecting direction.

The fourth guide hole 373 is arc-shaped as viewed in the optical axis direction. The fourth guide hole 373 is located below the second guide hole 332 in the aperture blade 33. The fourth guide hole 373 receives the connector 357 described above. The fourth guide hole 373 guides the movement of the connector 357.

Lever Blade 371

The lever blade 371 is located above the partition 370. The lever blade 371 includes a plate-like first portion 371*a* and a plate-like second portion 371*b*. One end of the first portion 371*a* and one end of the second portion 371*b* are connected to each other. The first portion 371*a* and the second portion 371*b* extend to have the other end of the first portion 371*a* and the other end of the second portion 371*b* in different directions on a plane intersecting with the vertical direction.

The lever blade 371 has a shaft hole 377, a first insertion hole 378, and a second insertion hole 379 in its surface. The shaft hole 377 is at a position at which the first portion 371*a* and the second portion 371*b* are connected. The shaft hole 377 receives the boss 318*d*. The lever blade 371 is rotatable about the boss 318*d*. In other words, the boss 318*d* functions as a rotational shaft when the lever blade 371 rotates.

The first insertion hole 378 is in the first portion 371*a* and extends through the first portion 371*a* in the vertical direction. The first insertion hole 378 receives the connector 357. The second insertion hole 379 is in the second portion 371*b* and extends through the second portion 371*b* in the vertical direction. The second insertion hole 379 receives the insertion portion 342 included in the blade 34.

Restrictor 50

The restrictor 50 restricts the movement of the blade 34 in the intersecting direction when the aperture blade 33 or the partition 370 is unattached in assembling and manufacturing the blade open-close device 30. The restrictor 50 is located on the upper surface 313 of the body 31.

Figure 4:
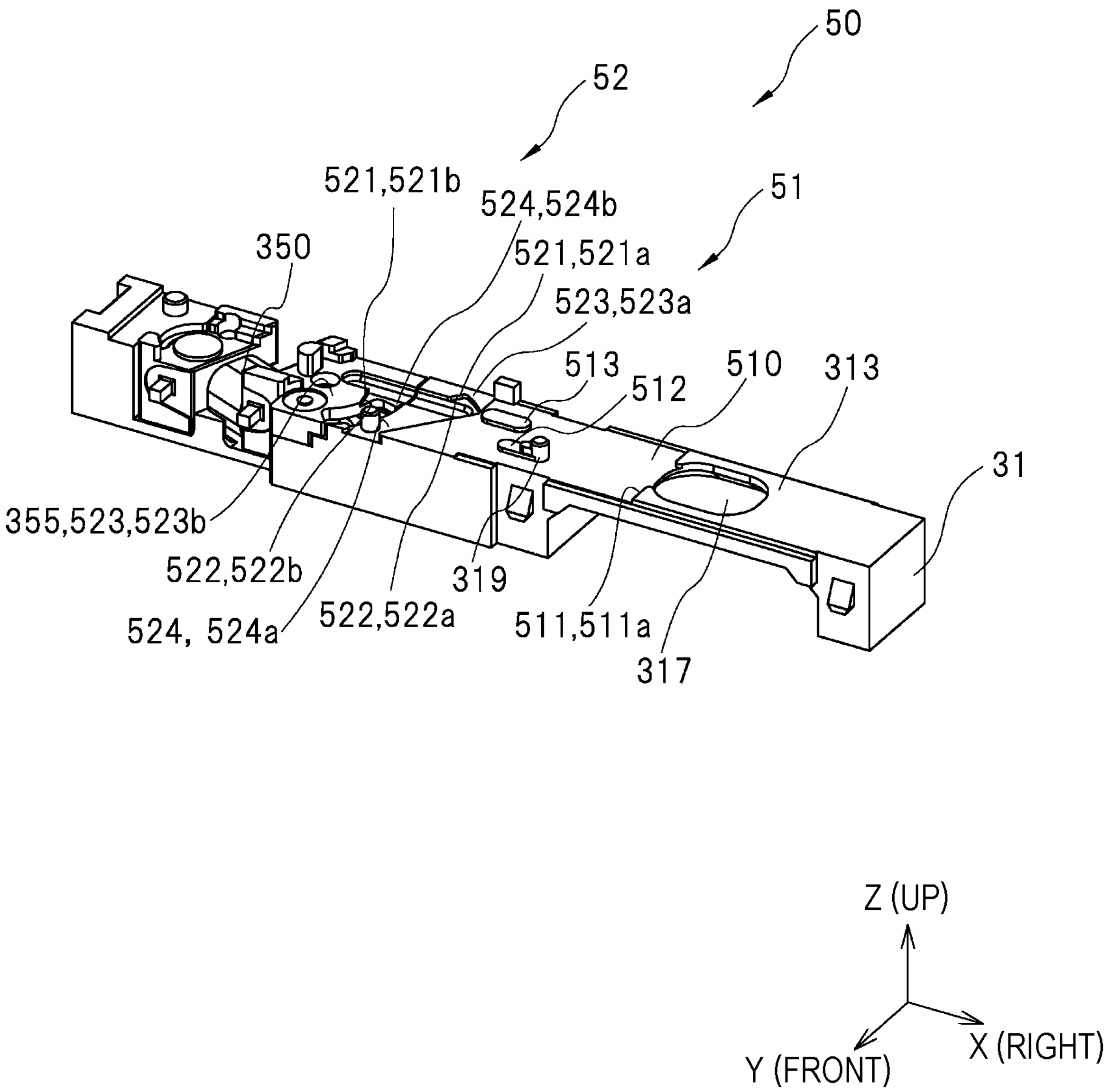
FIG. 4 is an external perspective view of a body.

FIG. 4 is a perspective view of the body 31 and the attachment member 350 accommodated in the body 31. As shown in FIG. 4, the restrictor 50 includes a first restrictor 51 and a second restrictor 52. The first restrictor 51 is located on the upper surface 313 of the body 31. The first restrictor 51 is located on the left of the body opening 317. The first restrictor 51 comes in contact with the blade 34 to restrict the movement of the blade 34 in the intersecting direction.

The second restrictor 52 is located on the upper surface 313 of the body 31 and the upper surface 355 of the attachment member 350. The second restrictor 52 is located on the left of the first restrictor 51 to restrict the movement of the lever blade 371. More specifically, the second restrictor 52 comes in contact with the lever blade 371 in the transmission member 37 to restrict the movement of the lever blade 371, thus preventing a driving force from being transmitted to the blade 34 through the transmission member 37. This restricts the movement of the blade 34.

First Restrictor 51

The first restrictor 51 includes the first restriction flat surface 510, a first step 511, a first protrusion 512, and a second protrusion 513. The first restriction flat surface 510 intersects with the optical axis direction and is located downward from the upper surface 313 of the body 31. More specifically, the first restriction flat surface 510 faces the aperture blade 33 in the optical axis direction, and is spaced farther from the aperture blade 33 than the upper surface 313 being a facing surface in the optical axis direction.

The first step 511 is located between the upper surface 313 of the body 31 and the first restriction flat surface 510. The first step 511 is located on the left of the body opening 317. More specifically, the first step 511 is located between, in the intersecting direction, the right end 34*a* being a first end of the blade 34 and the body opening 317 when the blade 34 is at the opening position.

The first step 511 has a first connection surface 511*a* connecting the upper surface 313 and the first restriction flat surface 510. The first connection surface 511*a* extends in the front-rear direction. The first connection surface 511*a* may extend in a direction that is not parallel to the front-rear direction, and may simply extend in a direction intersecting with the intersecting direction.

The first protrusion 512 is located on the left of and adjacent to the guide pin 319 located on a front portion of the first restriction flat surface 510. In other words, the first protrusion 512 is spaced from the first step 511 in the intersecting direction. The first protrusion 512 protrudes upward, or in other words, toward the blade 34. The second protrusion 513 is located leftward from the first protrusion 512 on a rear portion of the first restriction flat surface 510. In other words, the second protrusion 513 is spaced from the first step 511 in the intersecting direction. The second protrusion 513 protrudes upward, or in other words, toward the blade 34.

The first restrictor 51 may not include both the first protrusion 512 and the second protrusion 513, and may include one of the first protrusion 512 or the second protrusion 513 or include three or more protrusions. The first restrictor 51 may include neither the first protrusion 512 nor the second protrusion 513.

Second Restrictor 52

The second restrictor 52 is located on the left of the first restrictor 51 and on the upper surface 313 of the body 31 and the upper surface 355 of the attachment member 350. As described above, the attachment member 350 accommodated in the first compartment 310 has the outer shape defining a part of the outer shape of the body 31. The second restrictor 52 is thus located in the body 31.

The second restrictor 52 includes second steps 521*a* and 521*b* (collectively referred to as the second steps 521), placement surfaces 523*a* and 523*b* (collectively referred to as the placement surfaces 523), and second restriction flat surfaces 524*a* and 524*b* (collectively referred to as the second restriction flat surfaces 524). The placement surfaces 523 are flat surfaces intersecting with the optical axis direction and located downward from the first restriction flat surface 510 of the first restrictor 51. In other words, the placement surfaces 523 are spaced farther from the aperture blade 33 than the first restriction flat surface 510. The placement surface 523*a* is included in the body 31. The placement surface 523*b* corresponds to the upper surface 355 of the attachment member 350. The partition 370 in the transmission member 37 described above is located on the placement surfaces 523.

The second restriction flat surfaces 524 intersect with the optical axis direction and are located downward from the placement surfaces 523. In other words, the second restriction flat surfaces 524 are spaced farther from the aperture blade 33 than the placement surfaces 523 and face the aperture blade 33 in the optical axis direction. The second restriction flat surface 524*a* is included in the body 31. The second restriction flat surface 524*b* is included in the attachment member 350.

Each second step 521 is located between the corresponding placement surface 523 and the corresponding second restriction flat surface 524. Each second step 521 has a second connection surface 522 connecting the corresponding placement surface 523 and the corresponding second restriction flat surface 524. More specifically, the second step 521*a* is located between the placement surface 523*a* and the second restriction flat surface 524*a*, and a second connection surface 522*a* connects the placement surface 523*a* and the second restriction flat surface 524*a*. The second step 521*b* is located between the placement surface 523*b* and the second restriction flat surface 524*b*, and a second connection surface 522*b* connects the placement surface 523*b* and the second restriction flat surface 524*b*.

The second connection surface 522 of each second step 521 extends in a direction that is not parallel to the front-rear direction based on the shape of the lever blade 371. More specifically, the second connection surface 522*a* of the second step 521*a* extends in a direction in which the second portion 371*b* of the lever blade 371 extends. The second connection surface 522*b* of the second step 521*b* extends in a direction in which the first portion 371*a* of the lever blade 371 extends.

Operation

Figure 5A:
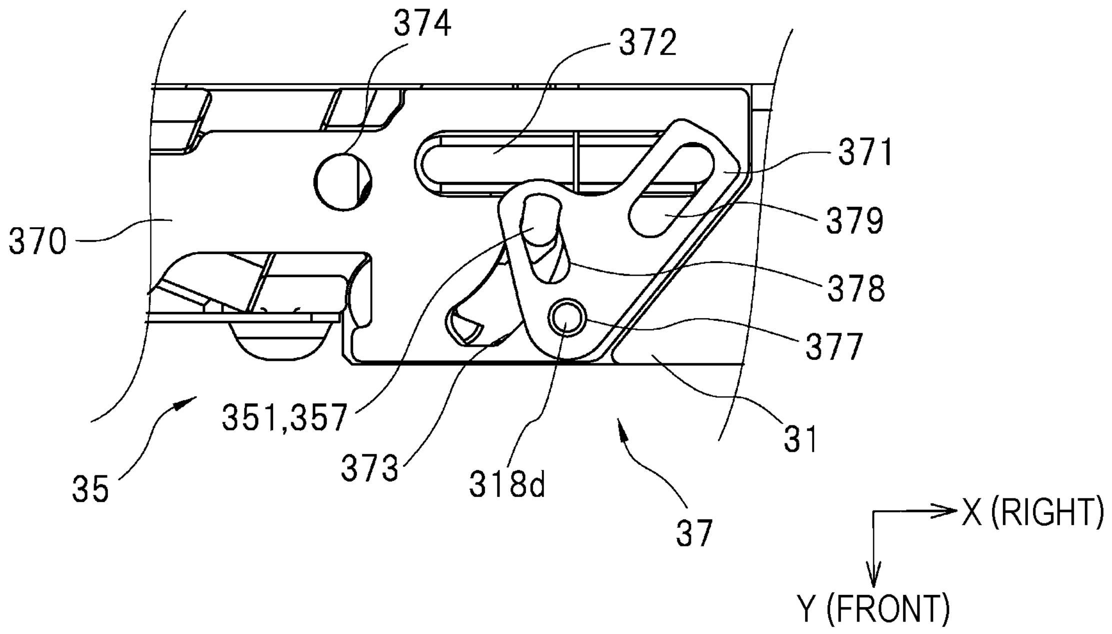
FIG. 5A is an external plan view of the body and a transmission assembly with a blade at a closing position.
Figure 5B:
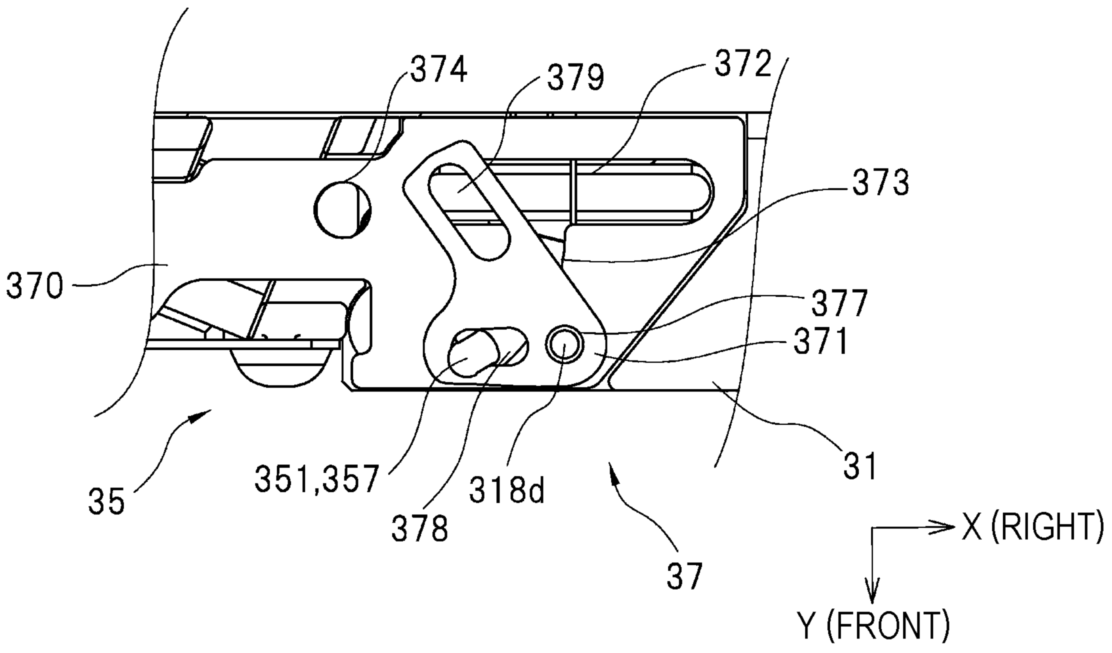
FIG. 5B is an external plan view of the body and the transmission assembly with the blade at an opening position.

The blade 34 being driven by the drive 35 and the transmission member 37 described above will be described with reference to FIGS. 5A and 5B. FIGS. 5A and 5B are partial plan views of the body 31, the drive 35, and the transmission member 37 as viewed in the direction along the optical axis K. The blade 34 is at the closing position in FIG. 5A and at the opening position in FIG. 5B.

When the blade 34 is at the closing position, the rotor magnet 351 and the connector 357 shown in FIG. 5A may rotate clockwise. The connector 357 is then engaged with an edge of the first insertion hole 378, causing the lever blade 371 to start moving counterclockwise in FIG. 5A about the boss 318*d* on one of the second restriction flat surfaces 524 as a rotational shaft. The insertion portion 342 in the blade 34 is then engaged with an edge of the second insertion hole 379 and guided along the first guide hole 331 in the aperture blade 33 and the third guide hole 372 in the partition 370 to move leftward. As the insertion portion 342 moves, the blade 34 including the insertion portion 342 is guided by the guide pin 319 to move leftward in the intersecting direction. The blade 34 then moves to the opening position at which the right end 34*a* is located leftward from the left end 330*b* of the opening 330 in the aperture blade 33.

When the blade 34 is at the closing position, the rotor magnet 351 and the connector 357 shown in FIG. 5B may rotate counterclockwise. The connector 357 is then engaged with the edge of the first insertion hole 378, causing the lever blade 371 to start moving clockwise in FIG. 5B about the boss 318*b*. The insertion portion 342 is then engaged with the edge of the second insertion hole 379 and guided along the first guide hole 331 in the aperture blade 33 and the third guide hole 372 in the partition 370 to move rightward. As the insertion portion 342 moves, the blade 34 including the insertion portion 342 is guided by the guide pin 319 to move rightward in the intersecting direction. The blade 34 then moves to the closing position at which the right end 34*a* is located rightward from the right end 330*a* of the opening 330 in the aperture blade 33.

Figure 6A:
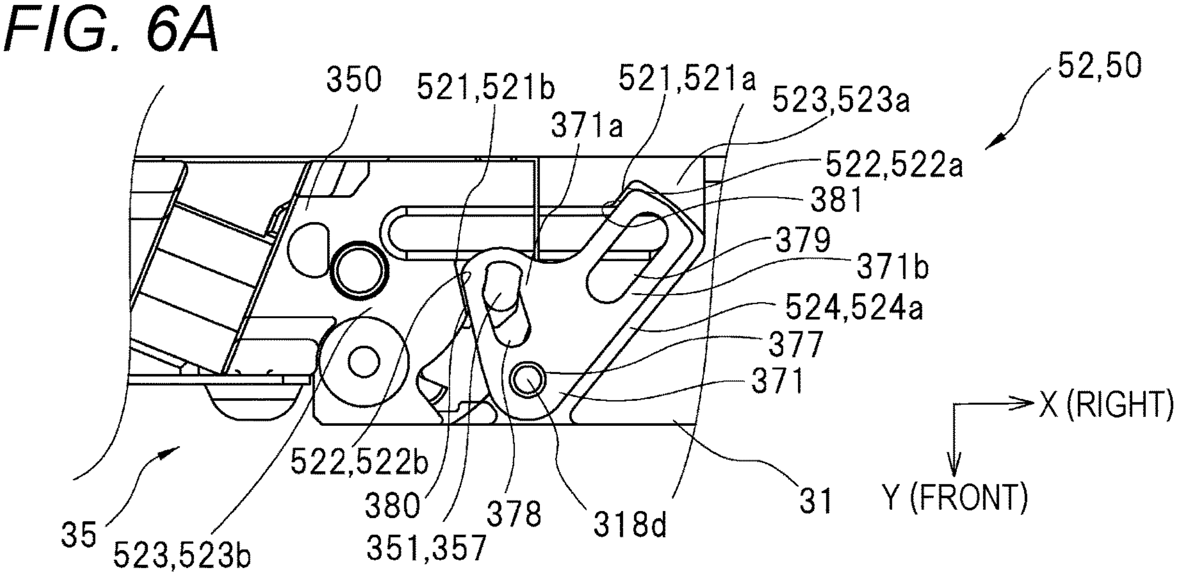
FIG. 6A is an external plan view of the body and the transmission assembly when no partition is attached.
Figure 6B:
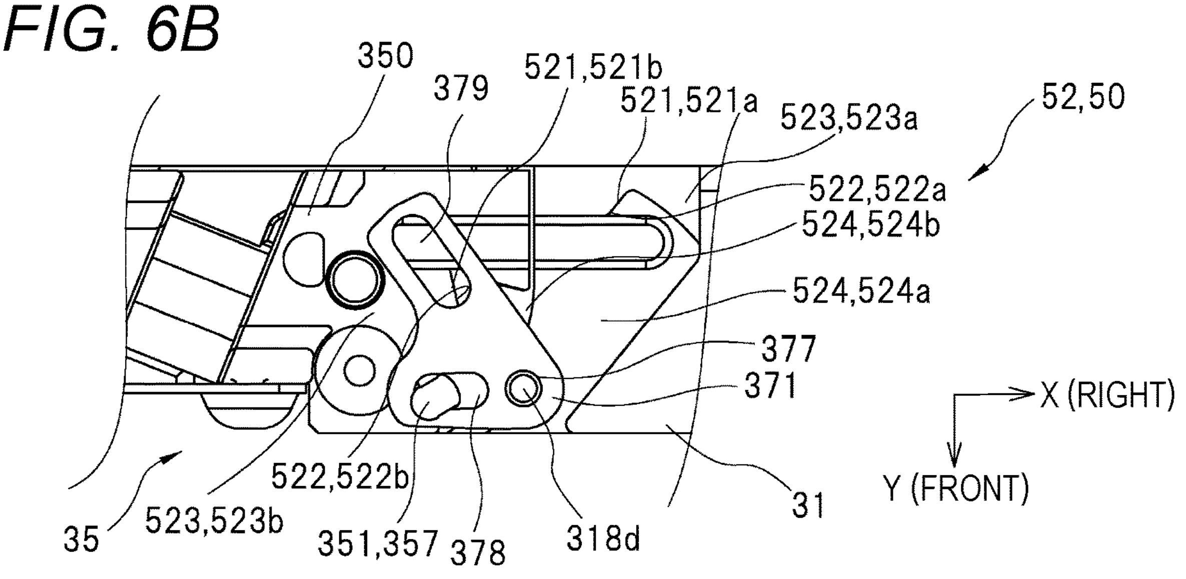
FIG. 6B is an external plan view of the body and the transmission assembly when no partition is attached.
Figure 6C:
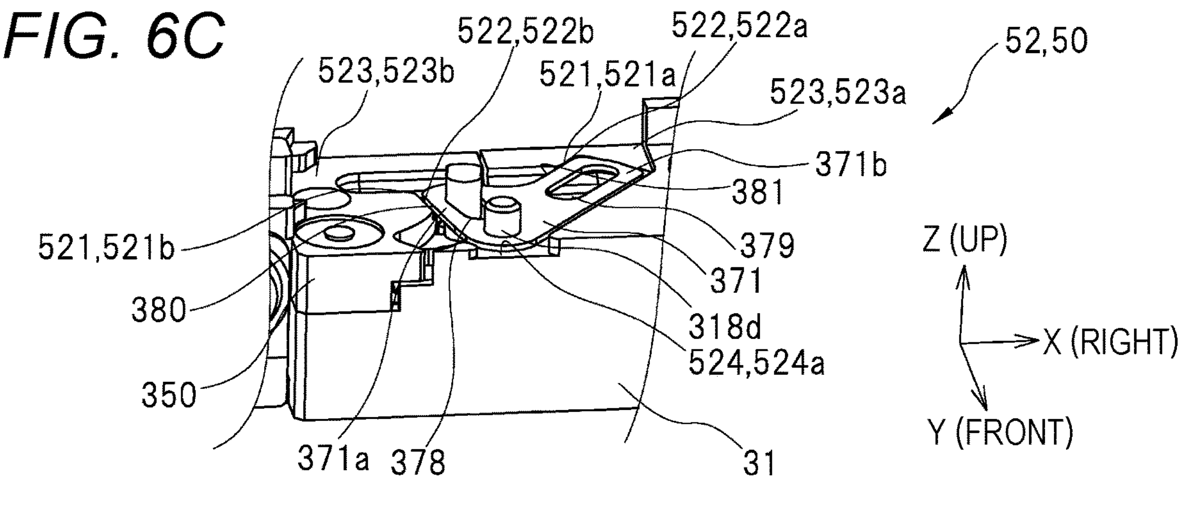
FIG. 6C is an external perspective view of the body and the transmission assembly when no partition is attached.

The blade 34 being driven by the drive 35 and the transmission member 37 when the partition 370 is unattached will now be described with reference to FIGS. 6A, 6B, and 6C. FIGS. 6A and 6B are partial plan views of the body 31, the drive 35, and the lever blade 371 in the transmission member 37 as viewed in the direction along the optical axis K. The blade 34 is at the closing position in FIG. 6A and at the opening position in FIG. 6B. FIG. 6C is a partial perspective view of the structure shown in FIG. 6A at the closing position.

With the partition 370 unattached, the lever blade 371 has its lower surface in contact with the upper surface 355 of the attachment member 350, or in other words, the placement surface 523*b*, at the opening position shown in FIG. 6B. When the lever blade 371 in this state rotates clockwise in FIG. 6B to move to its position corresponding to the closing position shown in FIG. 6A as described above, the lever blade 371 is located rightward from the second steps 521*a* and 521*b*. The lever blade 371 then falls, by its weight, on the tops of the second restriction flat surfaces 524 that are located downward from the placement surfaces 523 (refer to FIG. 6C).

As described above, the second connection surface 522*a* of the second step 521*a* extends in the direction in which the second portion 371*b* of the lever blade 371 extends. A side surface 381 of the second portion 371*b* of the lever blade 371 thus faces the second connection surface 522*a* of the second step 521*a*. The second connection surface 522*b* of the second step 521*b* extends in the direction in which the first portion 371*a* of the lever blade 371 extends. A side surface 380 of the first portion 371*a* of the lever blade 371 thus faces the second connection surface 522*b* of the second step 521*b*.

When the lever blade 371 is to rotate counterclockwise in FIG. 6A to move again from its position corresponding to the closing position to its position corresponding to the opening position, the side surface 381 comes in contact with the second connection surface 522*a* of the second step 521*a*, and the side surface 380 comes in contact with the second connection surface 522*b* of the second step 521*b*. The lever blade 371 is thus restricted from rotating counterclockwise by the second restrictor 52. In other words, the lever blade 371 is restricted by the second connection surfaces 522 extending in the directions intersecting with the rotation direction of the lever blade 371.

With the lever blade 371 restricted from rotating, the blade 34, which moves in the intersecting direction as the lever blade 371 rotates, is also restricted from moving. The blade 34 failing to move in the intersecting direction thus allows detection of the partition 370 being unattached in a performance test conducted after the blade open-close device 30 is assembled and manufactured.

Figure 7A:
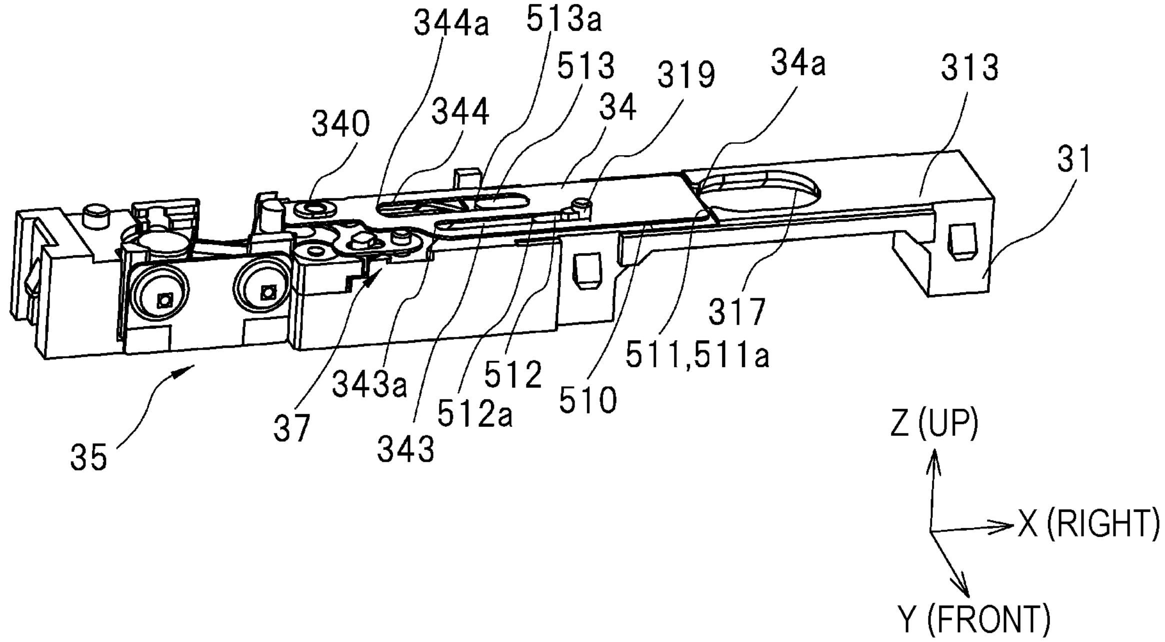
FIG. 7A is an external perspective view of the body and the blade when no aperture blade is attached.
Figure 7B:
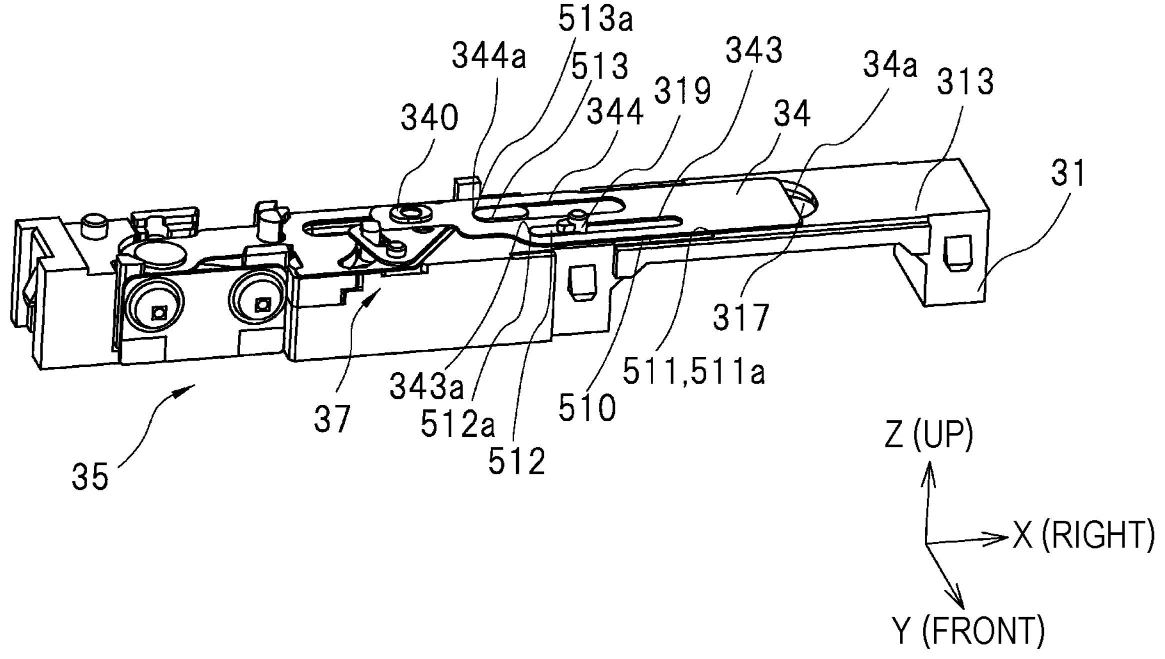
FIG. 7B is an external perspective view of the body and the blade when no aperture blade is attached.

The blade 34 being driven when the aperture blade 33 is unattached will now be described with reference to FIGS. 7A and 7B. FIGS. 7A and 7B are perspective views of the body 31 and the blade 34 when the aperture blade 33 is unattached. FIG. 7A shows the blade 34 at the opening position. As shown in FIG. 7A, with the aperture blade 33 unattached, the blade 34 has its lower surface in contact with the first restriction flat surface 510 of the first restrictor 51 on the top surface of the body 31. In other words, the blade 34 is fallen and located on the first restriction flat surface 510 located downward from the upper surface 313 of the body 31 by its weight.

As shown in FIG. 7A, the blade 34 at the opening position has the right end 34*a* leftward from the body opening 317. More specifically, the blade 34 has the right end 34*a* leftward from the first step 511. The guide hole 343 in the blade 34 receives the first protrusion 512 on the first restrictor 51. The elongated hole 344 in the blade 34 receives the second protrusion 513 on the first restrictor 51.

When the blade 34 in this state is to move rightward toward the closing position as the lever blade 371 rotates, the right end 34*a* of the blade 34 comes in contact with the first connection surface 511*a* of the first step 511. The blade 34, which is fallen and located on the first restriction flat surface 510, is thus restricted from moving rightward by the first step 511. The blade 34 failing to move in the intersecting direction thus allows detection of the aperture blade 33 being unattached in a performance test conducted after the blade open-close device 30 is assembled and manufactured.

The blade 34 is a rectangle extending in the intersecting direction as described above and includes the insertion portion 342 received by the lever blade 371 near its left end. In other words, the blade 34 has the right end 34*a* spaced from, in the intersecting direction, the insertion portion 342 that is driven as the lever blade 371 rotates. Thus, when moving rightward as the lever blade 371 rotates, for example, the blade 34 may bend, causing the right end 34*a* to move over the first step 511 to a position rightward from the first step 511.

In this case, as shown in FIG. 7B, the guide hole 343 receiving the first protrusion 512 moves rightward relative to the first protrusion 512. A left end 343*a* of the guide hole 343 then comes in contact with a left end 512*a* of the first protrusion 512. Similarly, the elongated hole 344 receiving the second protrusion 513 moves rightward relative to the second protrusion 513. A left end 344*a* of the elongated hole 344 then comes in contact with a left end 513*a* of the second protrusion 513. The first protrusion 512 received in the guide hole 343 and the second protrusion 513 received in the elongated hole 344 thus restrict the rightward movement of the blade 34. In this state, the blade 34 has the right end 34*a* at an intermediate position between the right end and the left end of the body opening 317. The blade 34 thus does not fully cover the body opening 317. In other words, the first protrusion 512 and the second protrusion 513 are positioned to allow the blade 34 to have the right end 34*a* leftward from the right end of the body opening 317. Thus, when the body opening 317 is not fully covered in a performance test conducted after the blade open-close device 30 is assembled and manufactured, the aperture blade 33 is determined to be unattached.

The structure according to the above embodiment produces at least one of the advantageous effects described below.

(1) The restrictor 50 that restricts the movement of the blade 34 in the intersecting direction is located on the upper surface 313 of the body 31 in the blade open-close device 30. The aperture blade 33 being an elongated member and the transmission member 37 are located between the body 31 and the blade 34 in the direction along the optical axis K. In this structure, when the aperture blade 33 or the transmission member 37 is unattached to the body 31, the restrictor 50 on the body 31 restricts the movement of the blade 34 in the intersecting direction. In other words, when the blade 34 malfunctions in a performance test conducted before the product is shipped, at least one of the components can be determined to be unattached. This reduces the likelihood that defective products to which the aperture blade 33 or the transmission member 37 is unattached are distributed.

(2) The restrictor 50 includes the first restrictor 51 that comes in contact with the blade 34 to restrict the movement of the blade 34. More specifically, the first restrictor 51 has the upper surface 313 being a facing surface with which the body 31 faces the aperture blade 33, the first restriction flat surface 510 spaced farther from the aperture blade 33 than the upper surface 313 in the optical axis direction, and the first step 511 between the upper surface 313 and the first restriction flat surface 510. In this structure, when the aperture blade 33 is unattached, the blade 34 is on the first restriction flat surface 510 by its weight and is restricted from moving in the intersecting direction by the first step 511. Thus, when the blade 34 fails to move during inspection conducted before shipment, the aperture blade 33 can be determined to be unattached.

(3) The first step 511 is located between, in the intersecting direction, the right end 34*a* being the first (right) end of the blade 34 and the body opening 317 in the body 31 when the blade 34 is at the opening position. The first step 511 extends in the front-rear direction intersecting with the intersecting direction. In this structure, when the aperture blade 33 is unattached, the first step 511 comes in contact with the right end 34*a* of the blade 34 as the blade 34 moves from the opening position to the closing position, thus restricting the blade 34 from moving to the closing position. The aperture blade 33 can thus be determined to be unattached during inspection conducted before shipment.

(4) The first step 511 has the first connection surface 511*a* connecting the upper surface 313 being a facing surface and the first restriction flat surface 510. The first connection surface 511*a* extends in a direction (front-rear direction) intersecting with the intersecting direction. When the aperture blade 33 is unattached, the first connection surface 511*a* comes in contact with the right end 34*a* of the blade 34 moving in the intersecting direction, thus restricting the movement of the blade 34. The aperture blade 33 can thus be determined to be unattached during inspection conducted before shipment.

(5) The first restrictor 51 includes the first protrusion 512 and the second protrusion 513 protruding toward the blade 34. The first protrusion 512 and the second protrusion 513 are spaced from the first step 511 in the intersecting direction. The first protrusion 512 and the second protrusion 513 are respectively received in the guide hole 343 and the elongated hole 344 in the blade 34 to restrict the movement of the blade 34 in the intersecting direction. The first protrusion 512 and the second protrusion 513 thus restrict the movement of the blade 34 when, for example, the blade 34 extending in the intersecting direction bends and causes the right end 34*a* of the blade 34 to move over the first step 511. Thus, when the blade 34 does not fully cover the body opening 317 during inspection conducted before shipment, the aperture blade 33 can be determined to be unattached.

(6) The restrictor 50 comes in contact with the transmission member 37 to restrict the movement of the blade 34. More specifically, the transmission member 37 includes the lever blade 371 and the partition 370 located between the lever blade 371 and the body 31 in the optical axis direction. The restrictor 50 includes the second restrictor 52 that restricts the movement of the lever blade 371. This structure restricts the movement of the lever blade 371 when the partition 370 is unattached to the body 31, causing the blade 34 to fail to move. Thus, when the blade 34 fails to move during inspection conducted before shipment, the partition 370 can be determined to be unattached.

(7) The second restrictor 52 has the placement surfaces 523, the second restriction flat surfaces 524 spaced farther from the aperture blade 33 than the placement surfaces 523 in the optical axis direction and facing the aperture blade 33 being an elongated member, and the second steps 521. Each second step 521 is located between the corresponding placement surface 523 and the corresponding second restriction flat surface 524. When the partition 370 is unattached in this structure, the lever blade 371 is on the second restriction flat surfaces 524 by its weight and is restricted from moving by the second steps 521, thus causing the blade 34 to fail to move. Thus, when the blade 34 fails to move during inspection conducted before shipment, the partition 370 can be determined to be unattached.

(8) The lever blade 371 rotates about the boss 318*d* that is located on one of the second restriction flat surfaces 524 and functions as a rotational shaft. The second connection surfaces 522 of the second steps 521 extend in the directions intersecting with the rotation direction of the lever blade 371. When the partition 370 is unattached in this structure, the second steps 521 restrict the rotational movement of the lever blade 371, thus causing the blade 34 to fail to move. The partition 370 can thus be determined to be unattached during inspection conducted before shipment.

In the above embodiment, the restrictor 50 includes the first restrictor 51 and the second restrictor 52. In some embodiments, the restrictor 50 may include at least one of the first restrictor 51 or the second restrictor 52.

The technique according to one or more embodiments of the present invention may provide the structure described below.

(1) A blade open-close device, comprising:
- an elongated member having an opening on an optical axis of an optical unit and extending in an intersecting direction intersecting with an optical axis direction in which the optical axis of the optical unit extends;
- a blade movable in the intersecting direction, the blade being configured to cover or uncover the opening;
- a drive configured to move the blade to one of a closing position to cover the opening or an opening position to uncover the opening;
- a transmission member configured to transmit a driving force generated by the drive to the blade;
- a body in which the elongated member, the blade, the drive, and the transmission member are located; and
- a restrictor configured to restrict movement of the blade in the intersecting direction,
- wherein the elongated member and the transmission member are located between the body and the blade in the optical axis direction,
- the body has a facing surface facing the elongated member and the transmission member, and
- the restrictor is located on the facing surface.

(2) The blade open-close device according to (1), wherein the restrictor includes a first restrictor and a second restrictor, the first restrictor comes in contact with the blade to restrict the movement of the blade, and the second restrictor comes in contact with the transmission member to restrict the movement of the blade.

(3) The blade open-close device according to (2), wherein the first restrictor has
- a first restriction flat surface spaced farther from the elongated member than the facing surface in the optical axis direction and facing the elongated member, and
- a first step between the facing surface of the body and the first restriction flat surface.

(4) The blade open-close device according to (3), wherein
- the body has a body opening overlapping the opening in the optical axis direction, and
- the first step is located between a first end of the blade and the body opening in the intersecting direction when the blade is at the opening position.

(5) The blade open-close device according to (3) or (4), wherein
- the first step has a first connection surface connecting the first restriction flat surface and the facing surface and extending in a direction intersecting with the intersecting direction, and
- the movement of the blade in the intersecting direction is restricted when the first end of the blade comes in contact with the first connection surface.

(6) The blade open-close device according to any one of (3) to (5), wherein
- the first restrictor includes a protrusion protruding toward the blade, and
- the protrusion is received in a hole in the blade to restrict the movement of the blade in the intersecting direction.

(7) The blade open-close device according to (6), wherein the protrusion is spaced from the first step in the intersecting direction.

(8) The blade open-close device according to any one of (2) to (7), wherein
- the transmission member includes a lever blade configured to transmit a driving force to the blade and a partition located between the lever blade and the body in the optical axis direction, and
- the second restrictor restricts movement of the lever blade.

(9) The blade open-close device according to (8), wherein the second restrictor has
- a placement surface on which the partition is located,
- a second restriction flat surface spaced farther from the elongated member than the placement surface in the optical axis direction and facing the elongated member, and
- a second step between the placement surface and the second restriction flat surface.

(10) The blade open-close device according to (9), wherein
- the lever blade rotates about a rotational shaft located on the second restriction flat surface,
- the second step has a second connection surface connecting the placement surface and the second restriction flat surface, and
- the second connection surface extends in a direction intersecting with a rotation direction of the lever blade.

What is claimed is:

1. A blade open-close device, comprising:
an elongated member having an opening on an optical axis of an optical unit and extending in an intersecting direction intersecting with an optical axis direction in which the optical axis of the optical unit extends;
a blade movable in the intersecting direction, the blade being configured to cover or uncover the opening;
a drive configured to move the blade to one of a closing position to cover the opening or an opening position to uncover the opening;
a transmission member configured to transmit a driving force generated by the drive to the blade;
a body in which the elongated member, the blade, the drive, and the transmission member are located; and
a restrictor configured to restrict movement of the blade in the intersecting direction, wherein the elongated member and the transmission member are located between the body and the blade in the optical axis direction,
the body has a facing surface facing the elongated member and the transmission member, and
the restrictor is located on the facing surface,
wherein the restrictor includes a first restrictor and the first restrictor comes in contact with the blade to restrict the movement of the blade.

2. The blade open-close device according to claim 1, wherein
the restrictor includes a second restrictor and the second restrictor comes in contact with the transmission member to restrict the movement of the blade.

3. The blade open-close device according to claim 2, wherein
the first restrictor has
a first restriction flat surface spaced farther from the elongated member than the facing surface in the optical axis direction and facing the elongated member, and
a first step between the facing surface of the body and the first restriction flat surface.

4. The blade open-close device according to claim 3, wherein
the body has a body opening overlapping the opening in the optical axis direction, and
the first step is located between a first end of the blade and the body opening in the intersecting direction when the blade is at the opening position.

5. The blade open-close device according to claim 4, wherein
the first step has a first connection surface connecting the first restriction flat surface and the facing surface and extending in a direction intersecting with the intersecting direction, and
the movement of the blade in the intersecting direction is restricted when the first end of the blade comes in contact with the first connection surface.

6. The blade open-close device according to claim 3, wherein
the first restrictor includes a protrusion protruding toward the blade, and
the protrusion is received in a hole in the blade to restrict the movement of the blade in the intersecting direction.

7. The blade open-close device according to claim 6, wherein
the protrusion is spaced from the first step in the intersecting direction.

8. The blade open-close device according to claim 2, wherein
the transmission member includes a lever blade configured to transmit a driving force to the blade and a partition located between the lever blade and the body in the optical axis direction, and
the second restrictor restricts movement of the lever blade.

9. The blade open-close device according to claim 8, wherein
the second restrictor has
a placement surface on which the partition is located,
a second restriction flat surface spaced farther from the elongated member than the placement surface in the optical axis direction and facing the elongated member, and
a second step between the placement surface and the second restriction flat surface.

10. The blade open-close device according to claim 9, wherein
the lever blade rotates about a rotational shaft located on the second restriction flat surface,
the second step has a second connection surface connecting the placement surface and the second restriction flat surface, and
the second connection surface extends in a direction intersecting with a rotation direction of the lever blade.

11. A blade open-close device, comprising:
an elongated member having an opening on an optical axis of an optical unit and extending in an intersecting direction intersecting with an optical axis direction in which the optical axis of the optical unit extends;
a blade movable in the intersecting direction, the blade being configured to cover or uncover the opening;
a drive configured to move the blade to one of a closing position to cover the opening or an opening position to uncover the opening;
a transmission member configured to transmit a driving force generated by the drive to the blade;
a body in which the elongated member, the blade, the drive, and the transmission member are located; and
a restrictor configured to restrict movement of the blade in the intersecting direction, wherein the elongated member and the transmission member are located between the body and the blade in the optical axis direction,
the body has a facing surface facing the elongated member and the transmission member, and
the restrictor is located on the facing surface,
wherein a second restrictor comes in contact with the transmission member to restrict the movement of the blade.

12. The blade open-close device according to claim 11, wherein
the restrictor includes a first restrictor and the second restrictor, the first restrictor comes in contact with the blade to restrict the movement of the blade.

13. The blade open-close device according to claim 12, wherein
the first restrictor has
a first restriction flat surface spaced farther from the elongated member than the facing surface in the optical axis direction and facing the elongated member, and
a first step between the facing surface of the body and the first restriction flat surface.

14. The blade open-close device according to claim 13, wherein
the body has a body opening overlapping the opening in the optical axis direction, and the first step is located between a first end of the blade and the body opening in the intersecting direction when the blade is at the opening position.

15. The blade open-close device according to claim 14, wherein the first step has a first connection surface connecting the first restriction flat surface and the facing surface and extending in a direction intersecting with the intersecting direction, and the movement of the blade in the intersecting direction is restricted when the first end of the blade comes in contact with the first connection surface.

16. The blade open-close device according to claim 13, wherein the first restrictor includes a protrusion protruding toward the blade, and the protrusion is received in a hole in the blade to restrict the movement of the blade in the intersecting direction.

17. The blade open-close device according to claim 16, wherein the protrusion is spaced from the first step in the intersecting direction.

18. The blade open-close device according to claim 12, wherein the transmission member includes a lever blade configured to transmit a driving force to the blade and a partition located between the lever blade and the body in the optical axis direction, and the second restrictor restricts movement of the lever blade.

19. The blade open-close device according to claim 18, wherein the second restrictor has a placement surface on which the partition is located, a second restriction flat surface spaced farther from the elongated member than the placement surface in the optical axis direction and facing the elongated member, and a second step between the placement surface and the second restriction flat surface.

20. The blade open-close device according to claim 19, wherein the lever blade rotates about a rotational shaft located on the second restriction flat surface, the second step has a second connection surface connecting the placement surface and the second restriction flat surface, and the second connection surface extends in a direction intersecting with a rotation direction of the lever blade.

* * * * *